United States Patent
Peterson et al.

(10) Patent No.: US 10,990,315 B2
(45) Date of Patent: Apr. 27, 2021

(54) WRITE TRANSFER RESOURCE MANAGEMENT IN A DATA STORAGE SYSTEM

(71) Applicant: International Business Machines Corporation, Armonk, NY (US)

(72) Inventors: Beth A. Peterson, Tucson, AZ (US); Dale F. Riedy, Poughkeepsie, NY (US); John R. Paveza, Morgan Hill, CA (US); Ronald E. Bretschneider, San Martin, CA (US); Brian Lee, San Jose, CA (US); Chung M. Fung, San Francisco, CA (US); Susan K. Candelaria, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/208,337

(22) Filed: Dec. 3, 2018

(65) Prior Publication Data
US 2020/0174691 A1    Jun. 4, 2020

(51) Int. Cl.
*G06F 3/00* (2006.01)
*G06F 3/06* (2006.01)
*G06F 12/02* (2006.01)

(52) U.S. Cl.
CPC .......... *G06F 3/0649* (2013.01); *G06F 3/061* (2013.01); *G06F 3/067* (2013.01); *G06F 3/0631* (2013.01); *G06F 12/023* (2013.01)

(58) Field of Classification Search
None
See application file for complete search history.

(56) References Cited

U.S. PATENT DOCUMENTS

| | | | |
|---|---|---|---|
| 9,560,134 B1 | 1/2017 | Smith | |
| 9,639,299 B2 | 5/2017 | Calder et al. | |
| 9,710,171 B2 | 7/2017 | Craddock et al. | |
| 2015/0199130 A1 | 7/2015 | Lee et al. | |
| 2016/0283116 A1* | 9/2016 | Ramalingam | G06F 12/0895 |

OTHER PUBLICATIONS

J. Gilberto et al., "Getting Started with IBM zHyperLink for z/OS" dated Jun. 2018, IBM International Technical Support Organization, Total 118 pages.

* cited by examiner

*Primary Examiner* — Midys Rojas
(74) *Attorney, Agent, or Firm* — William K. Konrad; Konrad, Raynes, Davda and Victor LLP

(57) ABSTRACT

Write transfer resource management in a data storage system in accordance with the present description includes overdue write transfer management logic which detects whether or not an established write set has become stale. In one embodiment, a determination is made as a function of whether a write transfer from a host and associated with an established write transfer set is overdue as measured by a time-out period of time. Upon determination that an established write transfer set has become stale, the stale write set is removed and the resources associated with the removed write set are freed for use by other write sets, significantly improving system performance. Other features and aspects may be realized, depending upon the particular application.

24 Claims, 7 Drawing Sheets

WRITE TRANSFER RESOURCE MANAGEMENT IN A DATA STORAGE SYSTEM

BACKGROUND OF THE INVENTION

1. Field of the Invention

The present invention relates to a computer program product, system, and method for write transfer resource management in data storage systems.

2. Description of the Related Art

An important metric of data storage performance is latency which measures the delay between a host issuing an input/output instruction or command to a storage controller or control unit, and receipt by the host of confirmation that the instruction has been successfully completed. Latency is affected by bandwidth, workload, transactional overhead and other factors.

To reduce latency, special low latency data communication links such as zHyperlink marketed by IBM may be established between a host and a storage controller. These low latency links can reduce the amount of transactional overhead associated with a read or write operation to increase the speed at which these Input/Output (I/O) operations are completed.

For example, to facilitate write transfers from the host to the storage controller over a zHyperlink connection, the host "preconditions" the storage controller prior to performing the actual write transfers by first issuing an "Establish Write Access" suborder which gives the storage controller advance notice as to what resources are appropriate for an expected or upcoming set of write transfers. As a result, a unique expected write transfer set is established and associated with a particular identifier such as a token number. In addition, an appropriate set of resources is reserved for the established write set. Once the write transfers of the established write set are successfully completed, the storage controller releases the resources associated with the write set upon request by the host. A "Remove Write Access" suborder is issued for the token and the write set is removed, terminating the "established" status of the write set. Another write set may be established and the freed resources previously allocated to a removed write set may be reallocated to the newly established write set associated with a different unique token.

SUMMARY

Write transfer resource management in accordance with the present description provides a significant improvement in computer technology. In one embodiment, write transfer resource management includes establishing a set of expected write transfers from a host, allocating resources to an established expected write transfer set, determining if a write transfer associated with the established expected write transfer set is overdue, and releasing resources allocated to established expected write transfer set if a write transfer associated with the established expected write transfer set is determined to be overdue. Thus, write transfer resource management in accordance with the present description can significantly improve the allocation of resources associated with write transfers from a host to a storage controller, and as a result, significantly improve system performance of a data storage system.

In another aspect of write transfer resource management in accordance with the present description, determining if a write transfer associated with the established expected write transfer set is overdue includes timestamping the established expected write transfer set with a timestamp and comparing elapsed time since the timestamp to a timeout value. In yet another aspect, determining if a write transfer associated with the established expected write transfer set is overdue includes updating a timestamp to an updated timestamp of an established expected write transfer set upon receipt of with a write transfer associated with the established expected write transfer set and comparing elapsed time since the updated timestamp to a timeout value. In this manner, a write transfer associated with the established expected write transfer set is determined to be overdue if the elapsed time since a last timestamp exceeds a timeout value. As a result, determining whether an established expected write transfer set is overdue may be accomplished in an efficient manner, reducing impact on system performance of any overhead associated with write transfer resource management in accordance with the present description. An established expected write transfer set is removed if a write transfer associated with the established expected write transfer set is determined to be overdue, permitting idle resources to be reallocated to more active write sets.

In another aspect, write transfer resource management in accordance with the present description further includes incrementing a counter having an output if a write transfer is received for a removed expected write transfer set, comparing the output of the counter to a first threshold and incrementing the timeout value if the output of the counter exceeds the first threshold. In yet another aspect, write transfer resource management further includes determining if the output of the counter has increased within an interval of time and decrementing the timeout value by a first decrement value if the output of the counter has not increased within the interval of time. As a result, the timeout value may be adjusted to optimize identification and removal of stale write sets, as a function of current operational conditions.

In still another aspect, write transfer resource management in accordance with the present description further includes comparing quantity of active established expected write transfer sets to a second threshold, and in response to the quantity of active established expected write transfer sets exceeding the second threshold, decrementing the timeout value by a second decrement value of greater magnitude than the first decrement value, if the output of the counter has not increased within the interval of time. As a result, identification and removal of stale write sets may be performed more aggressively as conditions warrant, further improving system performance.

DETAILED DESCRIPTION

Figure 1:
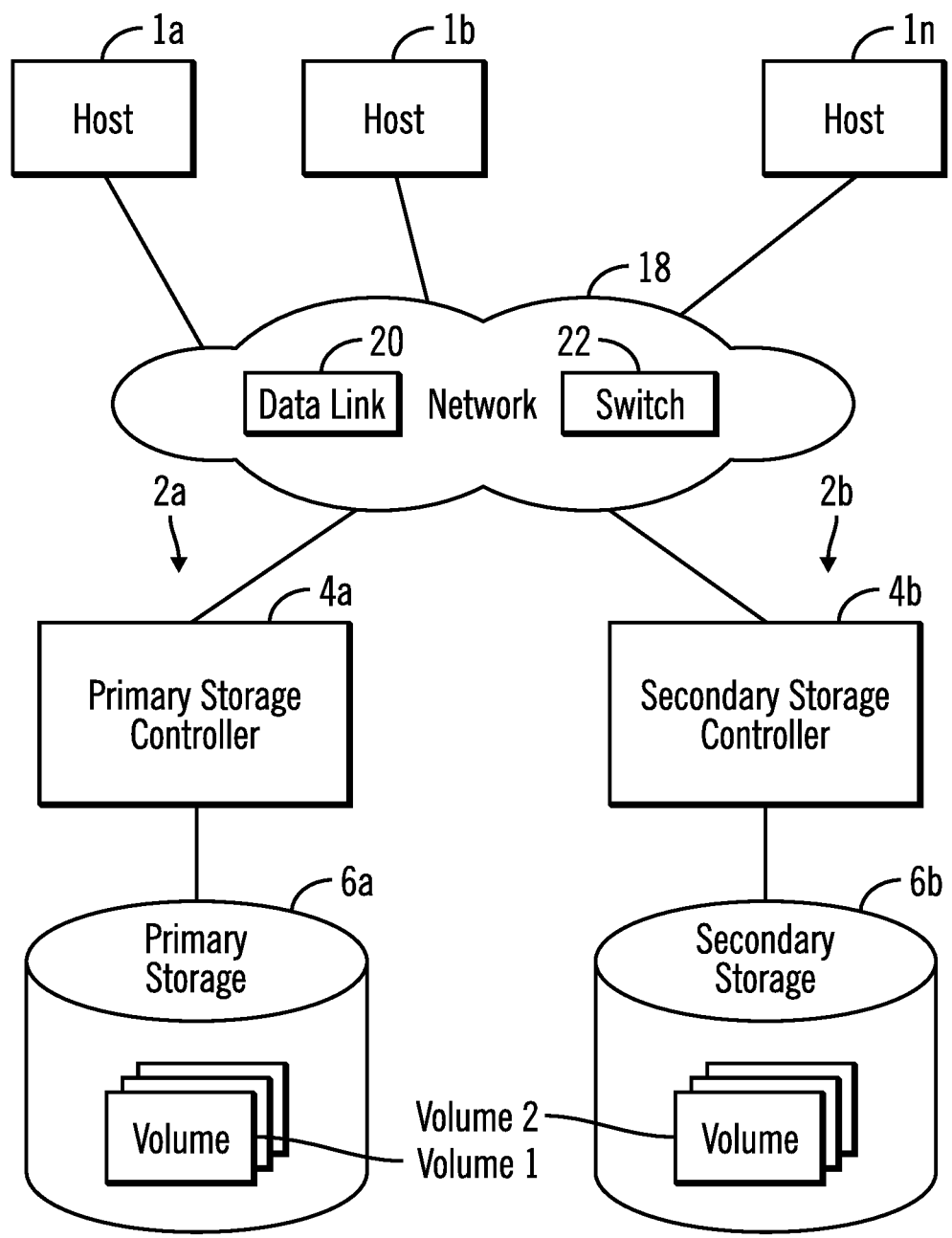
FIG. 1 illustrates an embodiment of a computing environment employing write transfer resource management in a data storage system in accordance with one aspect of the present description.

Write transfer resource management in accordance with the present description provides a significant improvement in computer technology. As described in greater detail below, write transfer resource management in accordance with the present description can significantly improve the allocation of resources associated with write transfers from a host to a storage controller, and as a result, significantly improve system performance of a data storage system.

For example, it is appreciated that in a low latency I/O communication path between a host and a storage controller, tracks and other resources allocated to a write set may not be actively used for write transfers because the write set has become stale or orphaned. For example, if there have not been any write transfers using resources allocated to a write set and intended to provide low latency write transfers, then it is possible the host is no longer aware of the write set or the resources allocated to the write set. As such, the write set may be orphaned by the host and is now stale. The lack of write transfers indicates that the writes set is unused by the host and potentially abandoned.

It is appreciated herein that stale write sets may result in resources allocated to a stale write set being idle instead of being used to complete write transfers for active write sets. Write transfer resource management in accordance with the present description facilitates re-allocating these idle resources to more active write sets for completion of write transfers in a more timely and efficient manner, and improving system performance.

It is further appreciated that stale write sets may occur due to a number of different conditions. For example, a host executing I/O software may lose connectivity with the storage controller due to various causes such network or connectivity configuration changes. In one example, path grouping which connects storage volumes controlled by the storage controller, to various hosts could change due to volumes being removed from a path group. The storage controller may also discontinue using volumes. Loss of connectivity between a source host and a target volume can prevent completion of write transfers from the source host to the target volume.

As another example, I/O applications executing on the host may experience delays in assembling the write transfers for a write set to be established in a storage controller. For example, an application executing in a host may attempt to assemble a complete write set but due to various factors may be successful in assembling only a partial write set. For example, a partial write set of a complete write set may establish write access to a single volume of a multi-volume data set. The complete write set typically has a set of tokens established, one for each volume of the data set. The application may cause the storage controller to establish the partial write set in the storage controller but typically the application executing on the host does not initiate the write transfers for an established partial write set. Thus, the application typically retains the write transfers of the established partial write set while it periodically attempts to obtain the remaining write sets of the complete write set. Once a complete write set has been obtained and established, the application executing on the host will begin issuing the write transfers of the complete write set to the storage controller. However, if the application experiences a significant delay in obtaining the remaining write sets, the already established partial write sets can become stale, blocking use of the resources assigned to the stale write sets.

If an extent or other unique resource has been assigned to an established full or partial write set which has become stale, other write sets associated with processes which need those same unique resources cannot be established because the needed resources are not available but instead remain allocated to the stale write sets. In addition to unique resources, other resources may be limited in quantity such as token numbers, for example. It is appreciated that stale write sets may also impact the availability of such limited resources, again hindering the establishment of other write sets.

Write transfer resource management in a data storage system in accordance with the present description includes overdue write transfer management logic which detects whether or not an established write set has become stale. In one embodiment, a determination is made as a function of whether a write transfer from a host and associated with an established write transfer set is overdue as measured by a time-out period of time. For example, stale write sets are identified as a function of the elapsed time from the establishment of a write set in the storage controller as compared to a time-out period if no write transfers are received since the write set was established. For established write sets in which write transfers are received, stale write sets are identified as a function of the elapsed time since the last write transfer was received for that write set, as compared to the time-out period. Upon determination that an established write transfer set has become stale, the stale write set is removed and the resources associated with the removed write set are freed for use by other write sets, significantly improving system performance. In one embodiment, the stale write set may be removed without action by the host.

In another aspect of write transfer resource management in accordance with the present description, overdue write transfer management logic is in one embodiment, adaptive so as to adapt to changing experience and conditions. Thus, parameters for identifying and removing stale write sets are modified as a function of changing conditions. For example, the duration of the time-out period of time may be increased or decreased depending upon the occurrence of certain events. In one embodiment, the time-out value for identifying and removing stale write sets is modified as a function of the number of write transfers which are attempted for a write set after that write set has been removed.

In yet another aspect, the level of aggressiveness in which write sets are declared stale and removed may be adapted as a function of changing conditions such as workload level and competition for limited resources. In one embodiment, the time-out value for identifying and removing stale write sets is modified as a function of the number of write sets which have been established.

In still another aspect of write transfer resource management in accordance with the present description, a user interface receives various user selected parameters for the write transfer resource management, which can significantly improve the accuracy and predictive value of stale write set removal. In one embodiment, these user selected parameters include one or more of initial time-out value, time-out decrement value, late write threshold value, established write set threshold value, and periodic check period values. Each of these user selected parameters can significantly improve the accuracy and predictive value of stale write set removal as described in greater detail below.

It is seen from the above that a data storage system employing write transfer resource management in accordance with the present description, in one embodiment, significantly improves efficient and economical operation of a data storage system. Other aspects and advantages may be realized, depending upon the particular application.

A system of one or more computers may be configured for write transfer resource management in a data storage system in accordance with the present description, by virtue of having software, firmware, hardware, or a combination of them installed on the system that in operation causes or cause the system to perform write transfer resource management in accordance with the present description. For example, one or more computer programs may be configured to perform write transfer resource management in a data storage system by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
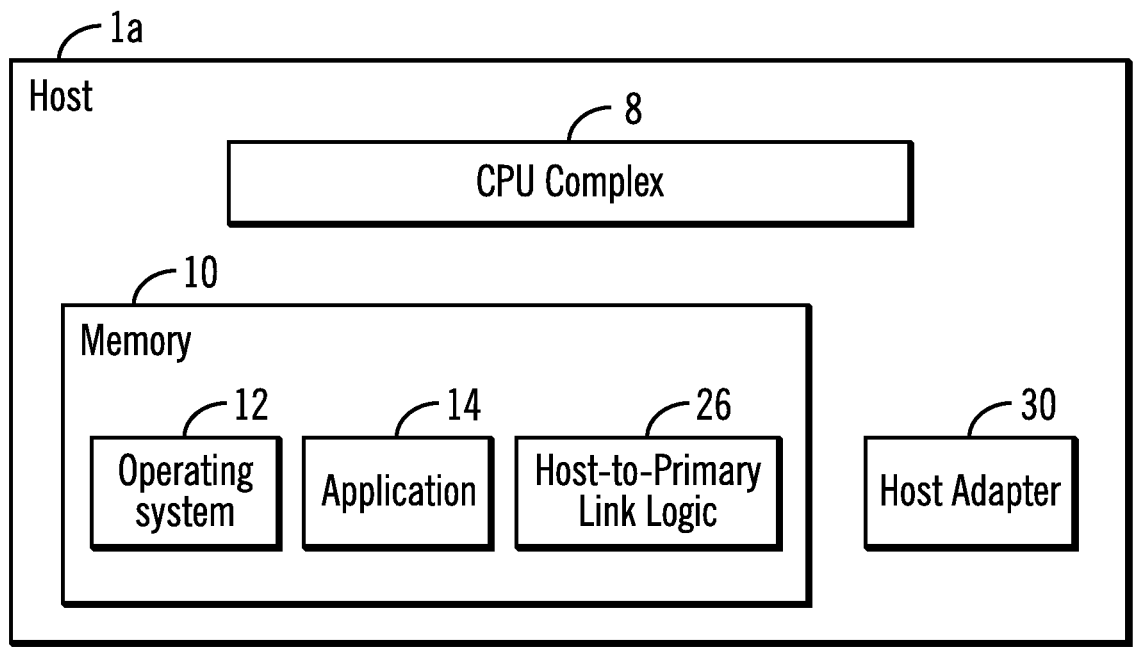
FIG. 2 illustrates an example of a host of the computing environment of FIG. 1, employing write transfer resource management in a data storage system in accordance with one aspect of the present description.
Figure 3:
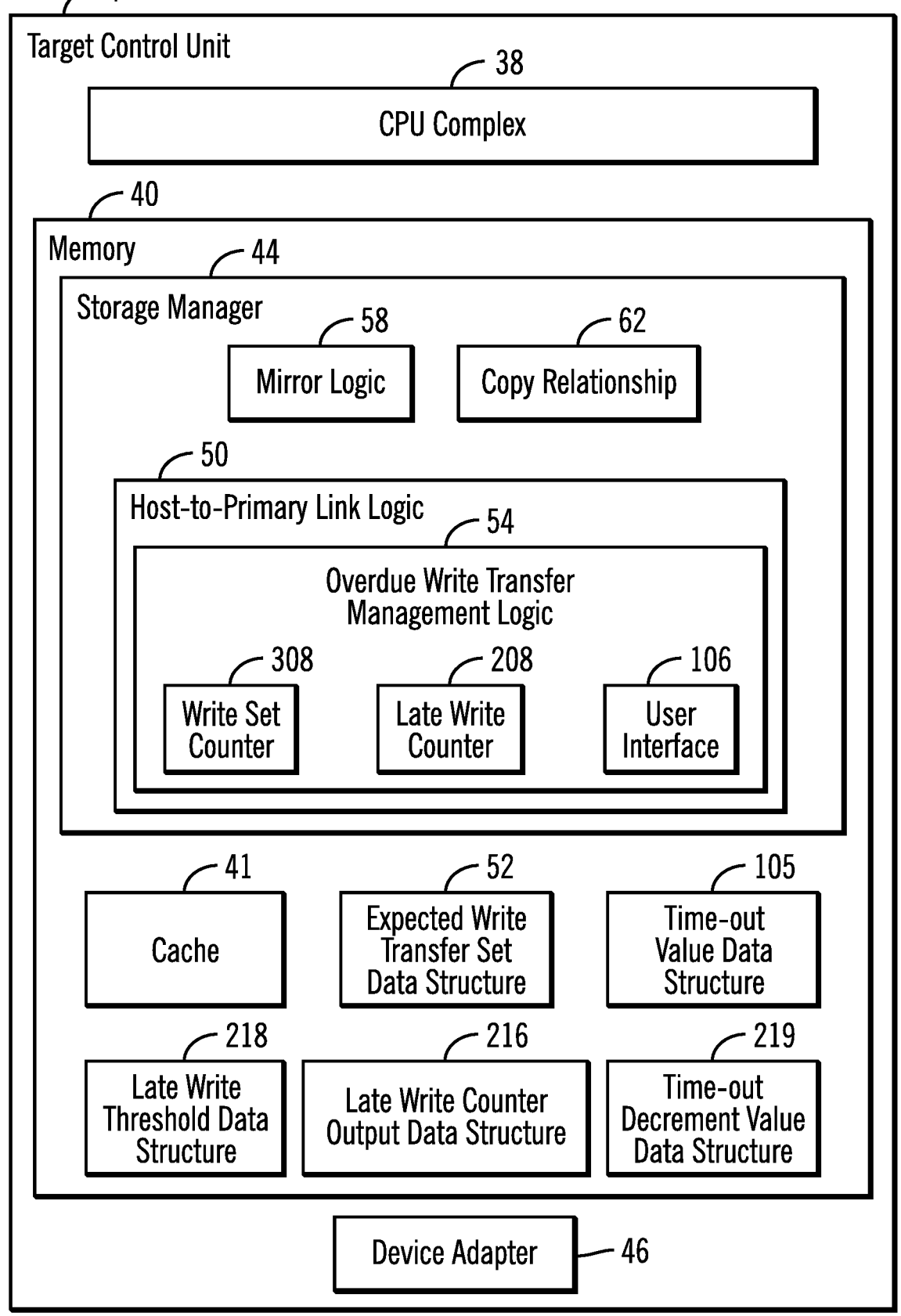
FIG. 3 illustrates an example of a storage controller of the computing environment of FIG. 1, employing write transfer resource management in accordance with one aspect of the present description.

FIGS. 1-3 illustrate an embodiment of a computing environment employing write transfer resource management in a data storage system in accordance with the present description. A plurality of hosts 1a (FIGS. 1, 2), 1b . . . 1n may submit Input/Output (I/O) requests to one or more data storage devices or systems 2a, 2b, to read or write data. Each data storage system 2a, 2b includes a storage controller or target control unit 4a, 4b, respectively, an example of which is shown in greater detail in FIG. 3 as target control unit 4, which accesses user data and metadata stored in multiple data storage units of storage 6a, 6b, respectively.

The hosts 1a, 1b . . . 1n may be separate physical devices or may be virtual devices implemented using assigned resources of partitions of a server, for example. In a similar manner, the target control units 4, 4a, 4b of the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

Data backup systems can provide continuous availability of production data in the event of a sudden catastrophic failure at a single point in time or data loss over a period of time. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy. Although FIG. 1 depicts a data backup system, it is appreciated that a computing environment employing write transfer resource management in a data storage system in accordance with the present description may be applied to any computer system having write transfers.

A typical host as represented by the host 1a of FIG. 2 includes a CPU complex 8 and a memory 10 having an operating system 12, and an application 14 that cooperate to read data from and write data updates to the storage 6a, 6b via a target control unit 4 (FIG. 3), 4a, 4b. An example of a suitable operating system is the z/OS operating system. It is appreciated that other types of operating systems may be employed, depending upon the particular application.

The I/O requests may be transmitted to the data storage systems 2a, 2b over a network 18 (FIG. 1) which may include one or more data links 20 and switches 22 of a connection fabric to provide a connection path through the connection fabric between a selected host 1a, 1b . . . 1n and a selected target such as a data storage system 2a, 2b. In the illustrated embodiment, one or more of the data links 20 is a low latency data link such as the zHyperlink connection marketed by IBM. As described in greater detail below, in one embodiment of write transfer resource management in accordance with the present description, host-to-primary link logic 26 of a source host is configured to initiate a set of low latency write transfer transactions, hereinafter referred to simply as a "write set", in which data is transferred in a set of write transfers from the source host such as the host 1a, to a target storage controller such as the primary storage controller 4a of the primary data storage system 2a. It is appreciated that write transfer resource management in accordance with the present description may be utilized in connection with other type of data links, both low latency and other latency, depending upon the particular application.

Each host 1a, 1b . . . 1n has one or more host adapters 30 (FIG. 2) which connects a host to a data link 20 of the network 18. The hosts and the data storage system 2a, 2b communicate in accordance with the zHyperlink, Fibre Channel Protocol (FCP), FICON or any other suitable protocol, depending upon the type of communication link.

Thus, the system components 1a (FIG. 1), 1b . . . 1n, 4 (FIG. 3), 4a, 4b, 6a, 6b, are connected to the network 18 which enables communication among these components. As noted above, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b . . . 1n may be based upon a particular host attachment protocol such as zHyperlink, Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The hosts 1a, 1b . . . 1n and the target control units 4, 4a, 4b controlling storage devices 6a, 6b, may each comprise any suitable computational device including those presently known in the art, such as, a personal computer, a workstation, a server, a mainframe, a hand held computer, a palm top computer, a telephony device, a network appliance, a blade computer, a processing device, etc. The hosts 1a, 1b . . . 1n and the target control units 4, 4a, 4b may be elements in any suitable network, such as, a storage area network, a wide area network, the Internet, an intranet. In certain embodiments, hosts 1a, 1b . . . 1n and the target control units 4, 4a, 4b may be elements in a cloud computing environment.

It is appreciated that one or more data storage units of the storage 6a, 6b may comprise any suitable device capable of storing data in a nonvolatile manner, such as hard drives, solid state drives, tape drives, etc., known in the art. Thus, in one embodiment, the storage 6a, 6b may be comprised of one or more sequential access storage devices, such as hard disk drives and magnetic tape drives or may also include non-sequential access storage devices such as solid state drives (SSD), for example. Such additional devices of storage 6a, 6b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 6a, 6b may also be other types of storage such as solid state drives in a RAID configuration to facilitate data recovery in the event of loss of a solid state drive. The storage units of the storage 6a, 6b may be configured to store data in subunits of data storage such as volumes, tracks, extents, etc.

Each target control unit 4 (FIG. 3), 4a, 4b (FIG. 1) of the illustrated embodiment, includes a CPU complex 38 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each target control unit 4 (FIG. 3), 4a, 4b further has a memory 40 that includes a storage manager 44 configured to manage storage operations including writing data to or reading data from a storage unit of an associated storage 6a, 6b in response to an I/O data request from a host or mirrored data from another data storage system. An I/O data request from a host may include a low latency write set as described herein, for example. In the illustrated embodiment, the memory 40 includes a cache 41 which may comprise one or more of different types of memory, such as RAMs, write caches, read caches, non-volatile storage (NVS), etc. The different types of memory that comprise the cache may interoperate with each other.

Each target control unit 4 (FIG. 3), 4a, 4b has one or more device adapters 46 (FIG. 3) which connects a target control unit to a data link 20 (FIG. 1) of the network 18. The storage manager 44 includes appropriate storage device drivers to configure associated storage 6a, 6b. The particular communication protocol for a data link 20 depends upon the particular data link. For example, a low latency data link 20 may utilize a zHyperlink protocol or other suitable communication protocol.

The CPU complex 38 of each target control unit 4 (FIG. 3), 4a, 4b may have multiple clusters of processors, each cluster having its own assigned memory 40, storage manager 44, cache, etc. The processing and memory resources assigned each cluster may be physical, virtual, shared, transferrable or dedicated, depending upon the particular application.

In one aspect of write transfer resource management in accordance with the present description, the storage manager 44 includes host-to-primary link logic 50 which manages data transfers over the data links 20 between the hosts and the storage controller 4a. As previously mentioned, to facilitate write transfers from the host to the storage controller over a known zHyperlink connection, the host "preconditions" the storage controller prior to performing the actual write transfers by first issuing an "Establish Write Access" suborder which gives the storage controller advance notice as to what resources are appropriate for an upcoming set of write transfers. As a result, the host-to-primary link logic 50 is configured to establish each expected write transfer set (also referred to herein as a "write set") as a unique write set associated with a unique identification such as a unique token number. Each write set which has been established may be identified by the host-to-primary link logic 50 in an expected write transfer set data structure 52 which stores the associated token number and identifies the write transfers expected to be received in association with the established write set. In addition, the host-to-primary link logic 50 is configured to allocate a set of resources reserved for the established write set. The resources allocated to each established write set may be identified in the data structure 52 as well. Resources which may be allocated to an established write set include memory buffers, storage segments, task control blocks or other resource units, depending upon the particular application.

Once the write transfers of an established write set are successfully received and completed, the storage controller releases the resources assigned to that write set. In one embodiment, a "Remove Write Access" suborder is issued for the token and the write set is removed from the data structure 52 or otherwise terminated so as to no longer have the "established" status. As additional write sets are established, the resources freed from the removed write set may be reallocated to a newly established write set which is associated with a different unique token.

As explained in greater detail below, the host-to-primary link logic 50 includes overdue write transfer management logic 54 which is configured to monitor each low latency write set which has been established in the storage controller, and determine whether any of the write transfers of an established write set have become overdue. In one embodiment, such a determination may be made with respect to a period of time, referred to herein as a "time-out" period. Thus, if a write transfer does not take place over the course of the time-out period of time for a particular established write set, that write set may be determined to be a stale write set and as such, may be removed from the storage controller. In addition, the resources allocated to the stale write set may be freed for use by other write sets upon the removal of the stale write set. As a consequence, idle resources previously allocated to a stale write set may be reallocated to a more active write set, putting those previously idle resources to active use completing write transfers and thereby improving system performance.

In another aspect of write transfer resource management in accordance with the present description, overdue write transfer management logic 54 is configured to be adaptive so as to adapt to actual workload experience and conditions. For example, the duration of the time-out period of time may be increased or decreased depending upon certain events. In one embodiment, if a sufficient number of write transfer requests are received for a previously established write set which has already been declared to be stale and as a result, has already been removed, the time-out period of time may be increased to reduce premature stale set determinations. Conversely, in the absence of a receipt of a significant number of write transfer requests for a stale write set which has already been removed, the time-out period of time may be decreased to accelerate the removal of stale write sets without increasing premature stale set determinations. Other factors and events may be monitored to adjust stale write set criteria as appropriate, as described in greater detail below.

Although FIG. 1 depicts a data backup system having data replication, it is appreciated that a computing environment employing write transfer resource management in a data storage system in accordance with the present description may be applied to any computer system having write transfers whether or not the computer system has disaster recovery or other data replication techniques. In one embodiment of a computer system employing data replication, the storage manager 44 further includes mirror logic 58 that is configured to execute in the primary target control unit 4a (FIG. 1) and perform copy operations to copy tracks or other portions of storage volumes from the primary target control unit 4a to the secondary target control unit 4b in a consistent manner. For example, a primary-secondary pair of volumes, volume1, volume2 (FIG. 1) are in an asynchronous copy or mirror relationship 62 such that updates to the primary volume1 are asynchronously mirrored to each secondary volume2.

In the illustrated embodiment, a copy relationship is represented by a data structure as represented by the copy relationships 62 of the memory 40 of FIG. 3. Thus, one or more copy relationships 62, which may be maintained by the mirror logic 58 for the primary and secondary target control units 4a, 4b, (FIG. 1) associate primary storage locations in the primary storage 6a and corresponding secondary storage locations in each of the secondary storage drives as represented by the storage 6b of the mirror relationship, such that updates to locations of the primary storage 6a are mirrored, that is, copied to the corresponding locations of the secondary storage 6b. For example, source storage locations in a primary storage volume1 (FIG. 1) of storage 6a may be asynchronously mirrored in a mirror operation to target storage locations of a secondary volume2 of the storage 6b pursuant to a mirror copy relationship 62 (FIG. 3). Similarly, source storage locations in the primary storage volume1 (FIG. 1) of storage 6a may be asynchronously mirrored in a mirror operation to additional target storage locations of another secondary volume2 of another secondary data storage system pursuant to a mirror copy relationship 62 (FIG. 3).

In the illustrated embodiment, a copy relationship of the copy relationships 62 comprises an asynchronous mirror relationship for a pair of storage locations in which updates to the primary (source) storage locations of the mirror relationship 62 are asynchronously mirrored to the secondary (target) storage locations of the mirror relationship 62. It is appreciated that other types of copy relationships such as synchronous, for example, may be established, depending upon the particular application.

In the configuration illustrated in FIG. 1, the storage controller 4a and the data storage 6a have been configured as a primary storage control unit and the primary storage, respectively, of a primary data storage system 2a. Similarly, the storage controller 4b and its data storage 6b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage 6a will be referred to as a primary storage 6a. Similarly, the storage controller or control unit 4b will be referred to as a secondary storage controller or control unit 4b and the data storage 6b will be referred to as a secondary data storage 6b.

In this embodiment, there may be multiple secondary data storages such that a copy relation can be in a one to many relationship, which is also referred to as a multi-target relationship.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

One mode of the mirroring may be implemented with asynchronous copy operations, such as an IBM's Global Mirror program modified as appropriate in accordance with present description. Another mode of the mirroring may be implemented with synchronous copy operations. The described mirroring operations may be implemented with other copy or recovery programs modified as appropriate in accordance with present description.

Figure 4:
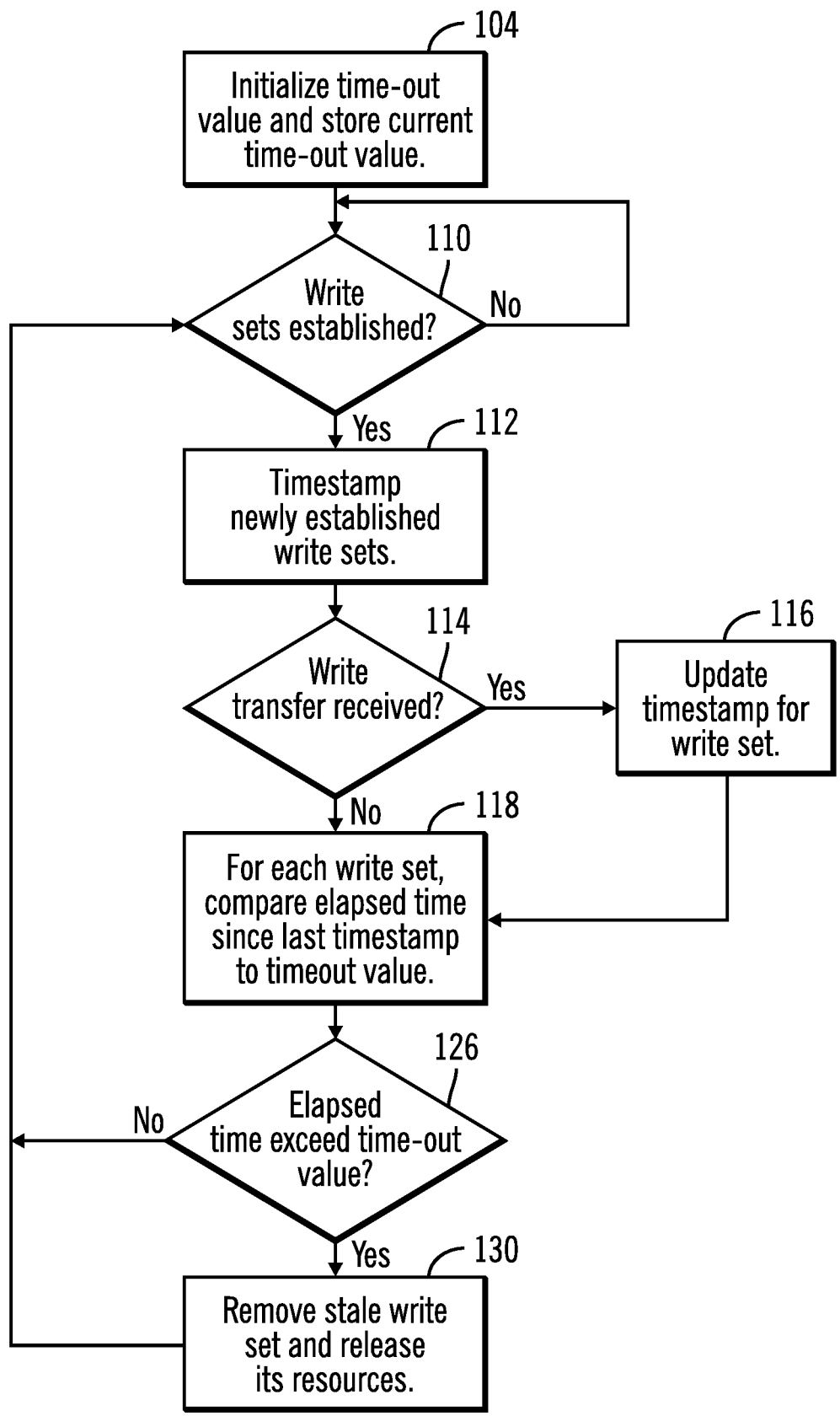
FIG. 4 illustrates an example of operations of components of the computing environment of FIG. 1, employing write transfer resource management in accordance with one aspect of the present description.

FIG. 4 depicts one example of operations of the overdue write transfer management logic 54 (FIG. 3) of the host-to-primary link logic 50 of the primary storage controller 4a, in evaluating whether or not an established write set is stale. In this example, the overdue write transfer management logic 54 is configured to determine whether a write transfer associated with an expected write transfer set which has been established by the host-to-primary link logic 50 of the primary storage controller 4a, is overdue as measured by a time-out period of time. The operations of FIG. 4 may be performed in one embodiment, in a background process in parallel with the operations of the host-to-primary link logic 50 in managing data transfers over the data links 20 between the hosts and the storage controller 4a.

Figure 5:
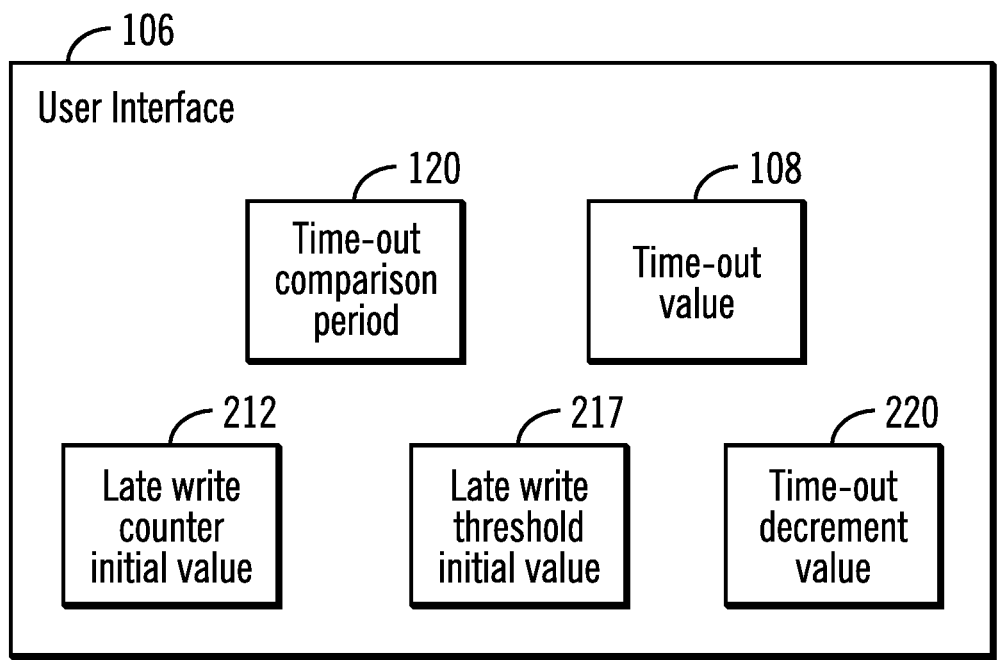
FIG. 5 illustrates an example of a user interface of the computing environment of FIG. 1 employing write transfer resource management in accordance with one aspect of the present description.

In the example of FIG. 4, a time-out period of time is initialized (block 104, FIG. 4) and the current time-out value is stored in a current time-out value data structure 105 (FIG. 3) for comparison purposes as described in greater detail below. In one embodiment, the initial time-out value may be a default value which may be over-ridden by a user selected time-out value which is input through an appropriate user interface 106 (FIG. 5) having a field 108 to receive the user selected initial time-out value. The initial time out value may be adjusted such that the current time-out value as indicated by the data structure 105 may change to adapt to changing circumstances and experience, as described below.

The overdue write transfer management logic 54 (FIG. 3) is configured to determine (block 110, FIG. 4) whether the host-to-primary link logic 50 has established any sets of expected write transfers from a host. Such a determination may be made, for example, by searching the expected write transfer set data structure 52 (FIG. 3) for write sets having a status identified as "established." For each write set identified as newly established, the overdue write transfer management logic 54 (FIG. 3) is configured to timestamp (block 112, FIG. 4) the newly established write set with a timestamp or other indicia indicating the time the particular write set was first established. The timestamp for each established write set may be stored in a suitable field of the expected write transfer set data structure 52 (FIG. 3), for example. As explained below, timestamping each newly established write set effectively sets a timer to time a period of time for each established write set. Upon expiration of the timer for a particular established write set without receiving a write transfer for the established write set within the time period, the write set is identified as stale and the resources allocated to the write set are freed.

Thus, the overdue write transfer management logic 54 (FIG. 3) is further configured to determine (block 114, FIG. 4) whether a write transfer associated with an established expected write transfer set has been received. In one embodiment, each time a write transfer is received, the established write set to which the received write transfer is associated, may be identified in the expected write transfer set data structure 52 (FIG. 3), for example. Received write transfers may be associated with established write sets using any suitable identification such as a unique token assigned to an established write set and the write transfers of the established write set. The unique token for each established write set may be identified in a suitable field of the expected write transfer set data structure 52 (FIG. 3), for example, and each write transfer may be identified using the assigned token, for example. It is appreciated that write transfers and the associated established write sets may be identified using a variety of identification techniques, depending upon the particular application.

Upon receipt of a write transfer, the timestamp of the established expected write transfer set associated with the received write transfer is updated (block 116, FIG. 4) to indicate the time the last write transfer of that established write set was received. Updating the timestamp effectively resets the timer for the write set. For each write set which has been established, the overdue write transfer management logic 54 (FIG. 3) is configured to compare (block 118, FIG. 4) the elapsed time since either the last timestamp, that is, the updated timestamp of the last received write transfer for an established write set, or the original timestamp when the write set was established if no write transfers have been received for the write set, to the current time-out value as indicated by the current time-out value data structure 105 (FIG. 3), to determine if a write transfer associated with the established expected write transfer set is overdue. In this manner, the overdue write transfer management logic 54 (FIG. 3) compares for each established write set, the elapsed time since either the updated timestamp or the original timestamp, whichever is later, to the current time-out value to determine if a write transfer associated with the established write set is overdue. In one embodiment, the comparisons of timestamps to time-out value for each established write set may be performed in a background process periodically, the period for which may be a default value or may be user selectable value through the user interface 106 (FIG. 5) having a field 120 to receive the user selected time-out comparison period.

The overdue write transfer management logic 54 (FIG. 3) is further configured to determine (block 126), FIG. 4), for each established write set comparison, whether the elapsed time since the updated timestamp of the last received write transfer for an established write set, or the original timestamp when the write set was established (if no write transfers have been received for that write set), exceeds the set time-out value. In other words, a determination is made as to whether the timer for the write set has expired without receipt of a write transfer for the write set within the time period of the timer. If it is determined that the elapsed time since the updated timestamp of the last received write transfer for an established write set, or the original timestamp when the write set was established (if no write transfers were received for that write set), exceeds the set time-out value, the established write set which exceeded the time-out value is determined to be a stale write set and the stale write set is removed (block 130, FIG. 4) from the list of established write sets of the data structure 52 (FIG. 3) and the resources allocated to that removed write set are released for use by other write sets. In addition, determining whether an established write set is overdue as described above is efficient, reducing any impact on system performance of any overhead associated with write transfer resource management in accordance with the present description.

In one embodiment, the information identifying a write set which is removed because it has become stale may remain in the expected write transfer set data structure 52. However, the status of the removed write set may be updated to a "removed" status, replacing the initial "established" status. Thus, write transfers are no longer expected for a removed write set. The information stored in the data structure 52 for a removed write set may be utilized to tune or adapt the stale write set identification and removal process as a function of events such as late write transfers received after a write set has been removed, as described in greater detail below.

The operations of FIG. 4 in which the overdue write transfer management logic 54 (FIG. 3) of the host-to-primary link logic 50 of the primary storage controller 4a evaluates each established write set to identify any established write set that has become stale, is continued (block 110). As noted above, in one embodiment, the operations of FIG. 4 may be performed in a periodic background process or other suitable process, depending upon the particular application.

In another aspect of write transfer resource management in accordance with the present description, overdue write transfer management logic 54 is in one embodiment, adaptive so as to adapt to changing experience and conditions. For example, the duration of the time-out period of time may be tuned by increasing or decreasing the time-out period depending upon the occurrence of certain events as described below.

Figure 6:
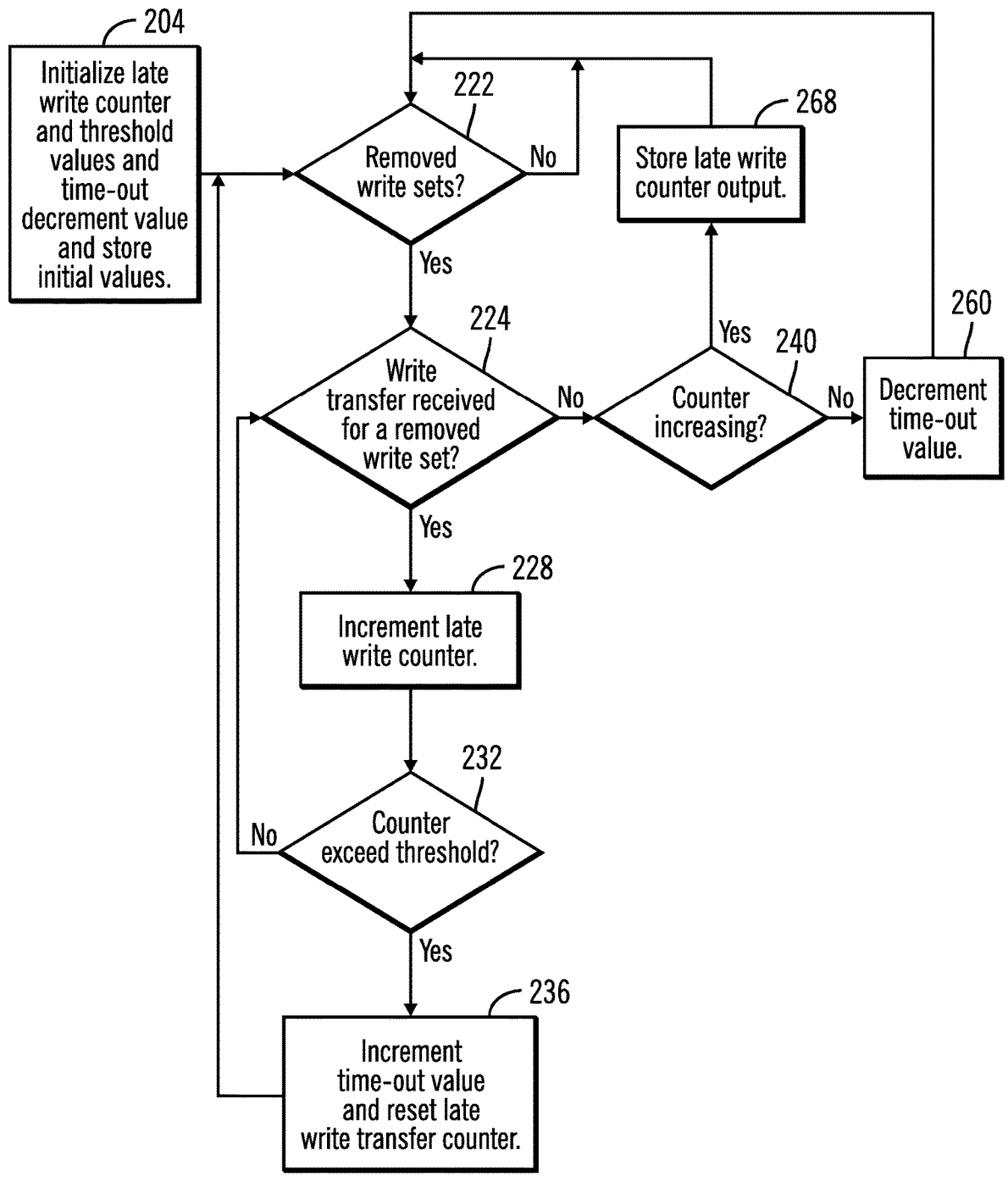

FIG. 6 shows an example of adaptive operations of the overdue write transfer management logic 54. In this example, the duration of the time-out value used to identify stale write sets as described in connection with FIG. 4, is tuned or adapted as a function of the number of write transfer requests received, if any, for previously established write sets which have already been declared to be stale and as a result, have already been removed. It is appreciated that other factors and events may be monitored to adjust stale write set identification criteria as appropriate, depending upon the particular application. In one embodiment, the operations of FIG. 6 may be performed in a periodic background process to the process of FIG. 4, or in other suitable processes, depending upon the particular application. The period for the periodic background process of FIG. 6 may be a default value or may be a user selectable value through the user interface 106 (FIG. 5) having a field to receive a user background process period similar to the field 120 of FIG. 5.

In the example of FIG. 6, the overdue write transfer management logic 54 initializes (block 204) a counter 208 (FIG. 3) of the of the overdue write transfer management logic 54. The counter 208 also referred to herein as a "late write" counter 208, counts the number of write transfers received for each write set after the write set has been identified as stale and has been removed. In one embodiment, the initial late write counter value for the removed write sets may be a default value such as zero counts, for example, and may be over-ridden by a user selected late write counter initialization value which is input through an appropriate user interface 106 (FIG. 5) having a field 212 to receive the user selected initial late write counter initialization value. The current output of the late write counter 208 may be stored (block 204, FIG. 6) in a counter output data structure 216 for comparison purposes as described below.

The overdue write transfer management logic 54 also initializes (block 204) a late write threshold value which is compared to the output of the "late write" counter 208 as described in greater detail below. In one embodiment, the late write threshold value may be a default value, for example, and may be over-ridden by a user selected late write threshold initialization value which is input through an appropriate user interface 106 (FIG. 5) having a field 217 to receive the user selected initial late write threshold value. The initial value of the late write threshold may be stored (block 204, FIG. 6) as the current late write threshold value in a data structure 218 (FIG. 3) for comparison purposes as described below. The initial late write threshold time out value may be adjusted such that the current late write threshold value as indicated by the data structure 218 may change to adapt to changing circumstances and experience, as described below.

In the example of FIG. 6, the magnitude of a potential decrement to the time-out value is also initialized (block 204, FIG. 6) and the current time-out decrement value is stored in a current time-out decrement value data structure 219 (FIG. 3) for decrementing the time-out value as described in greater detail below. In one embodiment, the initial time-out decrement value may be a default value which may be over-ridden by a user selected time-out value which is input through an appropriate user interface 106 (FIG. 5) having a field 220 to receive the user selected initial time-out decrement value. The initial time out decrement value may be adjusted such that the current time-out decrement value as indicated by the data structure 219 may change to adapt to changing circumstances and experience, as described below.

The overdue write transfer management logic 54 is further configured to determine (block 222, FIG. 6) whether any write sets have been removed as stale. Such a determination may be made, for example, by searching the expected write transfer set data structure 52 (FIG. 3) for write sets having a status identified as "removed."

The overdue write transfer management logic 54 (FIG. 3) is further configured to determine (block 224, FIG. 6) whether a write transfer associated with a removed write set has been received. In one embodiment, the overdue write transfer management logic 54 (FIG. 3) can periodically check for receipt of write transfers and each time a write transfer is received, a determination is made as to whether the received write transfer belongs to a removed write set. The period for the periodic write transfer receipt check (block 224) of FIG. 6 may be a default value or may be a user selectable value through the user interface 106 (FIG. 5) having a field to receive a user periodic write transfer receipt check period similar to the field 120 of FIG. 5.

The write set to which a received write transfer belongs and the established/removed status of the write set may be identified in the expected write transfer set data structure 52 (FIG. 3), for example. In a manner similar to that described above in connection with established write sets, received write transfers may be associated with removed write sets using any suitable identification such as a unique token assigned to a previously established write set and the write transfers of the previously established and now removed write set. The unique token for each established or removed write set may be identified in a suitable field of the expected write transfer set data structure 52 (FIG. 3), for example, and each write transfer may be identified using the assigned token, for example. It is appreciated that write transfers and the associated established or removed write sets may be identified using a variety of identification techniques, depending upon the particular application.

Upon receipt of a write transfer for a removed write set, the late write counter 208 (FIG. 3) is incremented (block 228, FIG. 6) by the overdue write transfer management logic 54 (FIG. 3) and the current, incremented output of the counter 208 is compared (block 232, FIG. 6) to a current "late write" threshold as indicated by the data structure 218 (FIG. 3) to determine if the current late write threshold has been exceeded. It is appreciated that if the current late write threshold has been exceeded by the number of late write transfers received for removed write sets, an excessive number of write sets may have been prematurely removed. Accordingly, the overdue write transfer management logic 54 (FIG. 3) is further configured to increment (block 236, FIG. 6) the time-out value stored in the time-out value data structure 105 (FIG. 3) to a time-out value of longer duration so as to reduce premature identification of established write sets as stale. For example, if host software is transmitting write transfers for established write sets but, due to various factors such as network congestion for example, at a somewhat slower pace than expected, increasing the duration of the time-out value allows a greater amount of time for the write transfers to be successfully received and completed before an established write set is characterized as stale and removed. Accordingly, each established write set has a greater chance of successfully completing its write transfers of the write set instead of being prematurely declared as stale and removed.

The overdue write transfer management logic 54 (FIG. 3) is further configured to reset or re-initialize (block 236, FIG. 6) the late write transfer counter following incrementing (block 236) the time-out value if the late write transfer counter exceeds (block 232) the late write transfer threshold. In one embodiment, the late write transfer counter may be periodically re-initialized whether or not the late write threshold is exceeded to provide a limit on the amount of time allowed for the counter to accumulate counts before the comparison (block 232) to the late write threshold. The period for the periodic counter re-initialization of FIG. 6 may be a default value or may be a user selectable value through the user interface 106 (FIG. 5) having a field to receive a user periodic counter re-initialization period similar to the field 120 of FIG. 5.

Conversely if it is determined (block 232, FIG. 6) that the current late write threshold has not been exceeded by the number of late write transfers received for removed write sets, failure to exceed the late write transfer threshold provides an indication that removal of most if not all of the write sets may have been the correct action to take to improve system performance. For example, if host software is transmitting an insufficient number of write transfers for some relatively inactive established write sets, the proper course of action may be to keep the time-out value unchanged, that is, not incremented, to facilitate removing those relatively inactive write sets and freeing the resources previously allocated to the removed write sets to be reallocated to more active write sets which can improve system performance. Accordingly, the overdue write transfer management logic 54 (FIG. 3) is further configured to return to block 224 and await further receipt of further late write transfers for removed write sets, if any, instead of incrementing the time-out value stored in the time-out value data structure 105 (FIG. 3) to a time-out value of longer duration, since the threshold has not yet been exceeded.

If it is determined (block 224) that no late write transfers have been received for removed write sets within the period of the periodic check for received late write transfers, the overdue write transfer management logic 54 (FIG. 3) is further configured to determine (block 240, FIG. 6) whether the output of the late write transfer counter is rising, such as whether the output of the late write transfer counter is rising within a predetermined interval of time, for example. The determination of whether the late write transfer counter output is rising may in one embodiment be performed periodically and the period for the periodic counter output rising check of FIG. 6 may be a default value or may be a user selectable value through the user interface 106 (FIG. 5) having a field to receive a user periodic counter output rising check period similar to the field 120 of FIG. 5.

It is appreciated that if the output of the late write counter is not rising, it provides an indication that additional late write transfers are not being received for removed write sets, and that removal of those write sets was likely a more optimal action to improve system performance. Moreover, it is appreciated that if the output of the late write counter is not rising, it provides an indication that the time-out value for determining stale write sets may be decreased to more quickly remove inactive write sets, re-allocate resources and further improve system performance.

In one embodiment, the current output of the late write transfer counter 208 may be compared to a prior late write counter output stored in the data structure 216 (FIG. 3) to determine (block 240, FIG. 6) whether the output of the late write transfer counter is rising. If the current output of the late write transfer counter 208 matches the last late write counter output value stored in the data structure 216 (FIG. 3), it is determined (block 240, FIG. 6) that the output of the late write transfer counter is not rising.

Accordingly, if it is determined (block 240, FIG. 6) that the output of the late write transfer counter is not rising, the overdue write transfer management logic 54 (FIG. 3) is further configured to decrement (block 260, FIG. 6) the time-out value used to identify stale write sets as described above in connection with FIG. 4. As noted above, it is appreciated that if the output of the late write counter 208 is not rising, it provides an indication that the time-out value for determining stale write sets may be decreased to more quickly time-out and remove inactive write sets, and more quickly re-allocate resources and further improve system performance.

Conversely, it is appreciated that if the output of the late write counter is rising, it provides an indication that additional late write transfers are being received for removed write sets, and that removal of some or all of those write sets may not have been optimal for improving system performance. Moreover, it is appreciated that if the output of the late write counter is rising, it provides an indication that the time-out value for determining stale write sets likely should not be decreased so as not to more quickly remove inactive write sets. Accordingly, if the output of the late write transfer counter 208 is determined (block 240, FIG. 6) to be rising, the current output of the late write transfer counter 208 is stored (block 268, FIG. 6) in the late write counter output data structure 216 (FIG. 3) to facilitate further determinations of whether the late write counter output is rising as described above. In addition, the operations of FIG. 6 continue (block 222, FIG. 6) but bypass the decrementing (block 260) of the time-out value.

It is seen that the operations of FIG. 6 provide a feedback look to adjust the time-out value and hence the demarcation of a stale write set as a function of the receipt of late write transfers after write sets have been identified as stale and have been removed. Should an excessive number of late write transfers be received because the time-out value is too short for current conditions, the time-out value may be incremented (block 236) which can slow the rate at which write sets are identified as stale and to provide additional time for receipt of write transfers before the write set is declared stale and removed. Once the time-out value is incremented to a more optimal value, the late write counter 208 will tend to avoid exceeding the late write threshold, such that further increments to the time-out value may cease as well. Conversely, should the time-out value be too long for current conditions such that too few write sets are identified as stale causing no late write transfers to be received (counter 308 stops rising), the time-out value may be decremented (block 260) until the time-out value is restored to a shorter, more optimal value for currently conditions.

Figure 7:
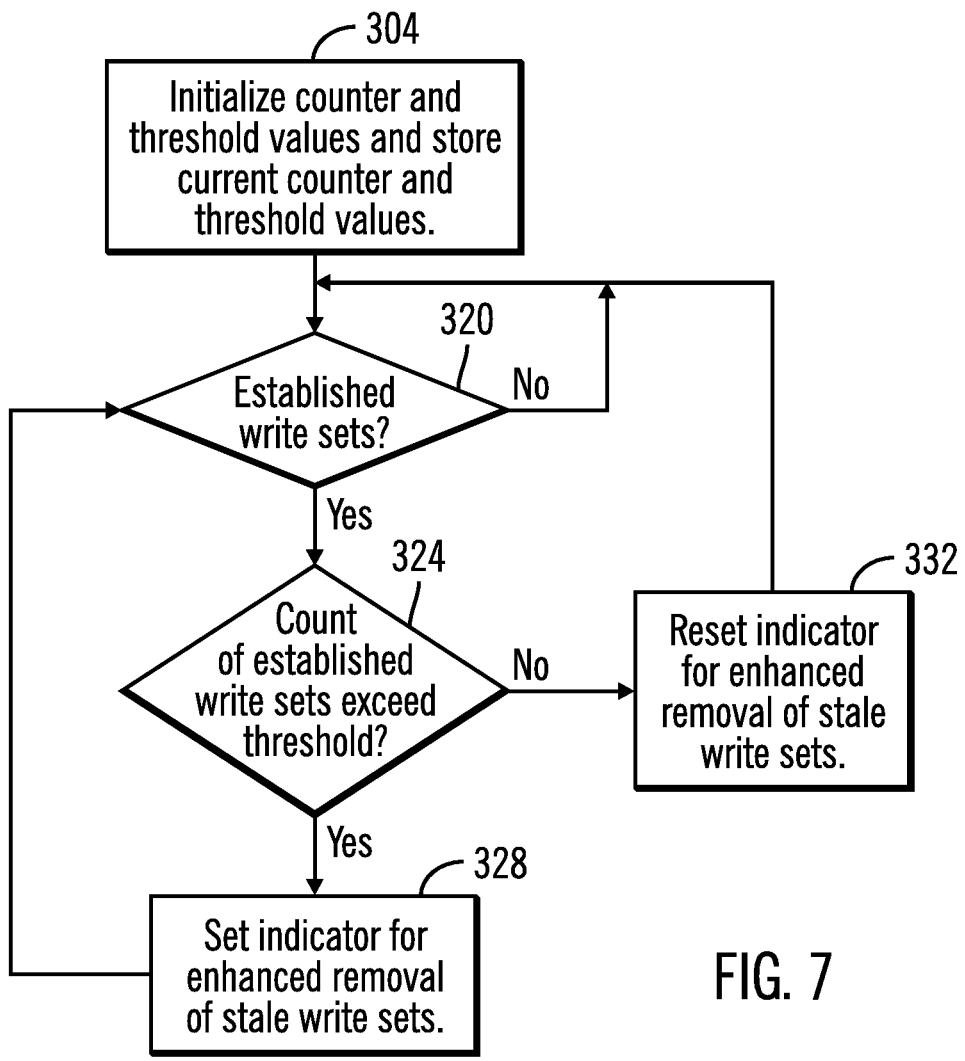
FIGS. 7-8 illustrate additional examples of operations of components of the computing environment of FIG. 1, employing write transfer resource management in accordance with one aspect of the present description.

As previously mentioned, in another aspect of write transfer resource management in accordance with the present description, overdue write transfer management logic 54 is in one embodiment, adaptive so as to adapt to changing experience and conditions. FIG. 7 shows an example of the magnitude of the time-out value decrement (block 260) of FIG. 6 being adapted as a function of occurrence of certain events and conditions as described below. It is appreciated that other factors and events may be monitored to adjust time-out increments and decrements as appropriate, depending upon the particular application.

In one embodiment, the operations of FIG. 7 may be performed in a periodic background process to the process of FIG. 6, or in other suitable processes, depending upon the particular application. The period for the periodic background process of FIG. 7 may be a default value or may be a user selectable value through the user interface 106 (FIG. 5) having a field to receive a user background process period similar to the field 120 of FIG. 5.

In the example of FIG. 7, the overdue write transfer management logic 54 initializes (block 304) a counter 308 (FIG. 3) of the of the overdue write transfer management logic 54. The counter 308 also referred to herein as a "write set" counter 308, counts the number or quantity of write sets which have been established and not yet completed or otherwise removed. In one embodiment, the initial established write set counter value for established write sets may be a default value such as zero counts, for example, and may be over-ridden by a user established write set counter initialization value which is input through an appropriate user interface 106 (FIG. 5) having a field similar to the field 212 to receive the user selected initial established write set initialization value.

The overdue write transfer management logic 54 also initializes (block 304) an established write set threshold value which is compared to the output of the established write set counter 308 as described in greater detail below. In one embodiment, the established write set threshold value may be a default value, for example, and may be over-ridden by a user selected established write set threshold initialization value which is input through an appropriate user interface 106 (FIG. 5) having a field similar to the field 217 to receive the user selected initial established write set threshold value. The initial value of established write set threshold may be stored (block 304, FIG. 6) as the current established write set threshold value in a data structure similar to the data structure 218 (FIG. 3) for comparison purposes as described below. The initial established write set threshold value may be adjusted such that the current established write set threshold value as indicated by the data structure may change to adapt to changing circumstances and experience, as described below.

The overdue write transfer management logic 54 (FIG. 3) is further configured to determine (block 320, FIG. 7) whether the host-to-primary link logic 50 has established one or more sets of expected write transfers from a host. Such a determination may be made, for example, by searching the expected write transfer set data structure 52 (FIG. 3) for write sets having a status identified as "established" as described above.

It is appreciated that there may be undetected stale write sets as a process employing write transfer management in accordance with the present description gains "experience", that is accumulates operational data to evaluate the effectiveness and modify as appropriate, the write transfer management. For example, in accordance with another aspect of the present description, as write sets are established, the total number of active write sets is checked. Thus, in one embodiment, the overdue write transfer management logic 54 (FIG. 3) is further configured to determine (block 324, FIG. 7) whether the number of write sets established by the host-to-primary link logic 50 but not yet completed or otherwise removed, exceeds an established write set threshold.

It is appreciated herein that the number of write sets established by the host-to-primary link logic 50 but not yet completed or otherwise removed, exceeding an established write set threshold may represent a "high water mark" of active write sets such that a modification of parameters of the write transfer management may be appropriate. Accordingly, if it is determined (block 324, FIG. 7) that the number of write sets established by the host-to-primary link logic 50 but not yet completed or otherwise removed, exceeds the established write set threshold, the overdue write transfer management logic 54 (FIG. 3) is further configured to set (block 328, FIG. 7) an indicator which indicates conditions are present for enhanced stale set removal as described in greater detail below in connection with FIG. 8. Conversely, if it is determined (block 324, FIG. 7) that the number of write sets established by the host-to-primary link logic 50 but not yet completed or otherwise removed, does not exceed the established write set threshold, the indicator which indicates conditions are present for enhanced stale set removal is reset (block 332, FIG. 7) such that enhanced state set removal is bypassed as described in greater detail below in connection with FIG. 8.

Figure 8:
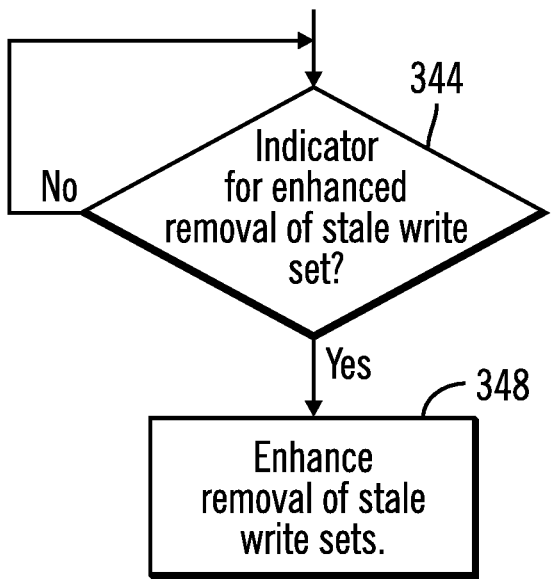

FIG. 8 shows an example of operations of the overdue write transfer management logic 54 (FIG. 3 enhancing stale set removal as conditions warrant. In one embodiment, the operations of FIG. 8 may be performed in a periodic background process to the processes of FIG. 6 or 7, or in other suitable processes, depending upon the particular application. The period for the periodic background process of FIG. 8 may be a default value or may be a user selectable value through the user interface 106 (FIG. 5) having a field to receive a user background process period similar to the field 120 of FIG. 5.

In the example of FIG. 8, the overdue write transfer management logic 54 is further configured to determine (block 344, FIG. 8) whether the indicator for enhanced removal of stale sets has been set as described above in connection with FIG. 7. If so, the overdue write transfer management logic 54 modifies one or more parameters of the write transfer management process to enhance (block

348, FIG. 8) the removal of stale sets. In one embodiment, the stale set removal may be enhanced by increasing the immediacy, rate, quantity or other process metric at which stale sets are removed.

For example, as noted above, it is appreciated that the number of write sets established in the storage controller reaching the established write set threshold represents a high water mark. As such, demand for resources will be high and enhanced or more aggressive removal of stale write sets can further improve system performance by accelerating the reallocation of idle resources to more active established write sets. Accordingly, in one embodiment, to enhance stale write set removal, all established write sets may be immediately evaluated to detect stale write sets rather than waiting for the next scheduled check (blocks 118, 126, FIG. 4) of a periodic background process. Alternatively or in addition, the period of a periodic background process for scheduling stale write set checks (blocks 118, 126, FIG. 4) may be reduced to increase the rate and timeliness of the stale write set checks.

As another example of enhanced removal of stale write sets (block 348, FIG. 7), the magnitude of the decrement (block 260, FIG. 4) to the time-out value may be increased to speed the reduction of the time-put value and to accelerate the identification of an established write set as stale. As noted above, it is appreciated that if the output of the late write counter 208 (FIG. 3) is not rising, it provides an indication that the time-out value for determining stale write sets may be decreased to more quickly remove inactive write sets, re-allocate resources and further improve system performance. The rate at which inactive write sets are detected as stale and removed may be further enhanced by increasing the magnitude of the decrement (block 260, FIG. 4) of the time-out value. By increasing the magnitude of the decrement to the time-out value, the elapsed time since the last write transfer for an established write set or the elapsed time since the write set was established if no write transfers have been received for that write set, will more quickly time-out, accelerating the detection of the write set as a stale write set and accelerating the reallocation of the idle resources of the removed stale write set to a more productive write set.

Thus, as the number of established write sets increases, there is more competition for resources. Under these conditions, the operations of FIGS. 7, 8 permit the timeout value to decrease more aggressively to allow for faster removal of stale write sets. Although setting of the indicator for enhanced removal of stale write sets causes a more aggressive removal of stale write sets as described above in connection with FIG. 8, the operations described above in connection with FIG. 6 provide a feedback loop which counteracts enhanced removal of stale write sets if too aggressive. For example, if enhanced stale write set removal causes receipt of an excessive number of late writes as indicated by the late write counter 208 exceeding the late write threshold as described above in connection with FIG. 6, the time-out value may be incremented (block 236, FIG. 6) by the feedback loop of FIG. 6 to counteract overly aggressive stale write set removal, and restore the time-out value to a more optimal value.

It is seen from the above that a process for identifying and removing stale write sets in accordance with the present description is based upon a variety of factors, depending upon the particular application. In one embodiment, stale write sets are identified as a function of the elapsed time from the establishment of a write set in the storage controller as compared to a time-out period if no write transfers are received since the write set was established. For established write sets in which write transfers are received, stale write sets are identified as a function of the elapsed time since the last write transfer was received for that write set, as compared to the time-out period.

In another aspect of write transfer resource management in accordance with the present description, parameters for identifying and removing stale write sets are modified as a function of changing conditions. In one embodiment, the time-out value for identifying and removing stale write sets is modified as a function of the number of write transfers which are attempted for a write set after that write set has been removed. In another embodiment, the time-out value for identifying and removing stale write sets is modified as a function of the number of write sets which have been established.

In the illustrated embodiment, the storage manager 44 including the overdue write transfer management logic 54 is depicted as software stored in the memory 40 and executed by the CPU complex 38. However, it is appreciated that the logic functions of the storage manager 44 may be implemented as hardware, software, firmware or combinations of one or more thereof, depending upon the particular application.

The storage manager 44 (FIG. 3) in one embodiment stores data in the cache and transfers data between the cache and storage 6a, 6b (FIG. 1) in tracks. Similarly, the storage manager 44 (FIG. 3) in one embodiment transfers data from the primary storage 6a (FIG. a) to a secondary storage 6b in tracks. As used herein in one embodiment, the term track refers to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in input/output operations in accordance with the present description may vary, depending upon the particular application. Thus, as used herein, the term "track" or the term "segment" refers to any suitable subunit of data storage or transfer.

Figure 9:
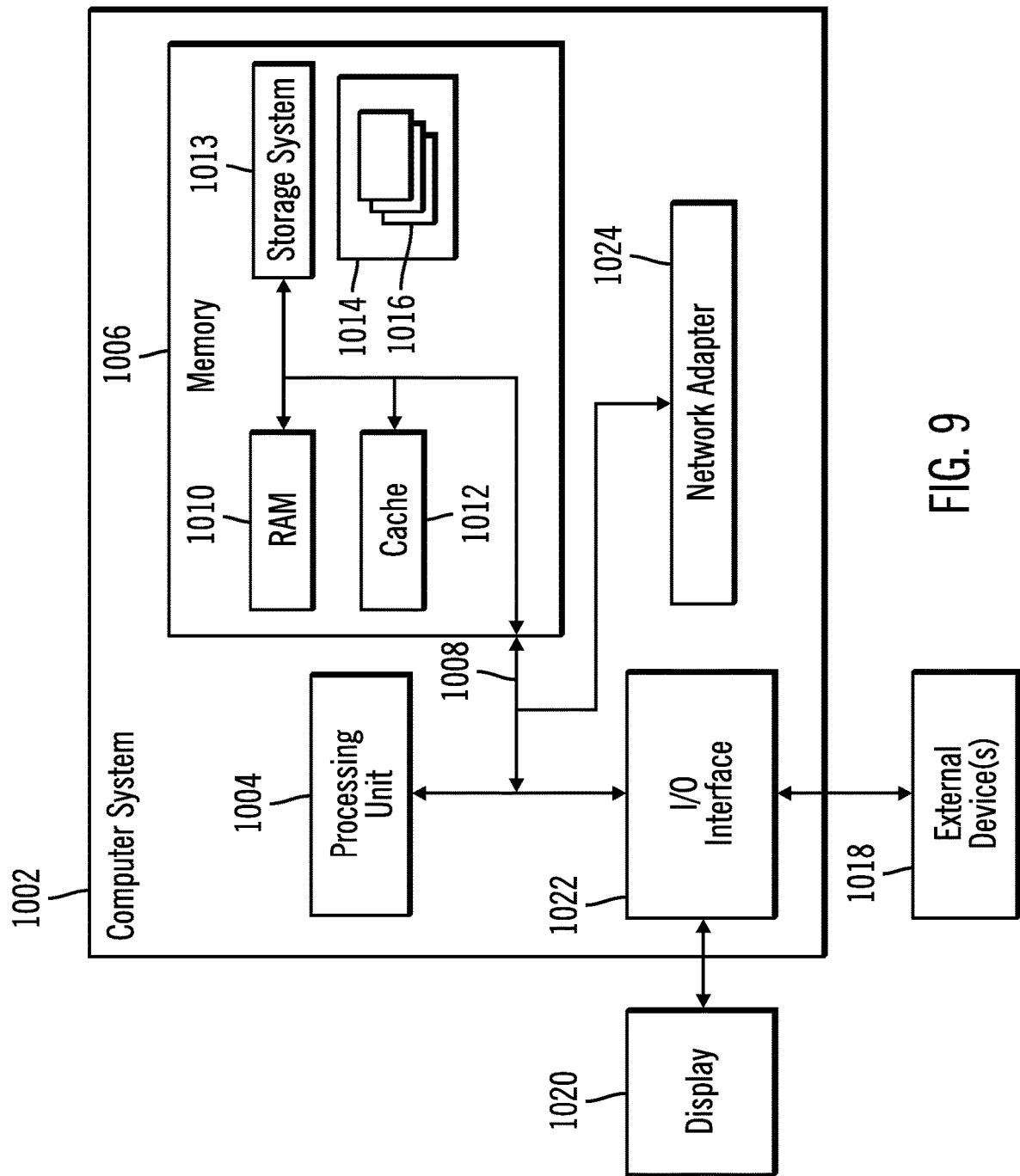
FIG. 9 illustrates a computer embodiment employing write transfer resource management in a data storage system in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product configured for use with a host, and a data storage system having a storage controller and at least one storage unit controlled by the storage controller and configured to store data, wherein the storage controller has a processor, and wherein the computer program product comprises a computer readable storage medium having program instructions embodied therewith, the program instructions executable by a processor of the storage controller to cause storage controller processor operations, the storage controller processor operations comprising:

establishing a set of expected write transfers;

allocating resources to an established expected write transfer set;

determining whether a write transfer associated with the established expected write transfer set is overdue; and in response to determining that a write transfer associated with the established expected write transfer set is overdue, releasing resources allocated to the established expected write transfer set associated with the write transfer determined to be overdue.

2. The computer program product of claim 1 wherein determining if a write transfer associated with the established expected write transfer set is overdue includes timestamping the established expected write transfer set with a first timestamp and comparing elapsed time since the first timestamp to a timeout value.

3. The computer program product of claim 2 wherein determining if a write transfer associated with the established expected write transfer set is overdue includes updating a timestamp to a second, updated timestamp of an established expected write transfer set upon receipt of a write transfer associated with the established expected write transfer set wherein the second, updated timestamp is later than the first timestamp, and comparing elapsed time since the second, updated timestamp to a timeout value.

4. The computer program product of claim 3 wherein a write transfer associated with the established expected write transfer set is determined to be overdue if the elapsed time since a last timestamp exceeds a timeout value.

5. The computer program product of claim 4 wherein the storage controller processor operations further comprise removing an established expected write transfer set if a write transfer associated with the established expected write transfer set is determined to be overdue.

6. The computer program product of claim 5 wherein the storage controller processor operations further comprise incrementing a counter having an output if a write transfer is received for a removed expected write transfer set, comparing the output of the counter to a first threshold and incrementing the timeout value if the output of the counter exceeds the first threshold.

7. The computer program product of claim 6 wherein the storage controller processor operations further comprise determining if the output of the counter has increased within an interval of time and decrementing the timeout value by a first decrement value if the output of the counter has not increased within the interval of time.

8. The computer program product of claim 7 wherein the storage controller processor operations further comprise comparing quantity of active established expected write transfer sets to a second threshold, and in response to the quantity of active established expected write transfer sets exceeding the second threshold, decrementing the timeout value by a second decrement value of greater magnitude than the first decrement value, if the output of the counter has not increased within the interval of time.

9. A system configured for use with a host, comprising:

a data storage system having a storage controller and at least one storage unit controlled by the storage controller and configured to store data, wherein the storage controller has a processor; and a computer program product comprising a computer readable storage medium having program instructions embodied therewith, the program instructions executable by a processor of the storage controller to cause storage controller processor operations, the storage controller processor operations comprising:

establishing a set of expected write transfers;

allocating resources to an established expected write transfer set;

determining whether a write transfer associated with the established expected write transfer set is overdue; and in response to determining that a write transfer associated with the established expected write transfer set is overdue, releasing resources allocated to the established expected write transfer set associated with the write transfer determined to be overdue.

10. The system of claim 9 wherein determining if a write transfer associated with the established expected write transfer set is overdue includes timestamping the established expected write transfer set with a first timestamp and comparing elapsed time since the first timestamp to a timeout value.

11. The system of claim 10 wherein determining if a write transfer associated with the established expected write transfer set is overdue includes updating a timestamp to a second, updated timestamp of an established expected write transfer set upon receipt of a write transfer associated with the established expected write transfer set wherein the second, updated timestamp is later than the first timestamp, and comparing elapsed time since the second, updated timestamp to a timeout value.

12. The system of claim 11 wherein a write transfer associated with the established expected write transfer set is determined to be overdue if the elapsed time since a last timestamp exceeds a timeout value.

13. The system of claim 12 wherein the storage controller processor operations further comprise removing an established expected write transfer set if a write transfer associated with the established expected write transfer set is determined to be overdue.

14. The system of claim 13 wherein the storage controller processor operations further comprise incrementing a counter having an output if a write transfer is received for a removed expected write transfer set, comparing the output of the counter to a first threshold and incrementing the timeout value if the output of the counter exceeds the first threshold.

15. The system of claim 14 wherein the storage controller processor operations further comprise determining if the output of the counter has increased within an interval of time and decrementing the timeout value by a first decrement value if the output of the counter has not increased within the interval of time.

16. The system of claim 15 wherein the storage controller processor operations further comprise comparing quantity of active established expected write transfer sets to a second threshold, and in response to the quantity of active established expected write transfer sets exceeding the second threshold, decrementing the timeout value by a second decrement value of greater magnitude than the first decrement value, if the output of the counter has not increased within the interval of time.

17. A method, comprising:

establishing a set of expected write transfers;

allocating resources to an established expected write transfer set;

determining whether a write transfer associated with the established expected write transfer set is overdue; and in response to determining that a write transfer associated with the established expected write transfer set is overdue, releasing resources allocated to the established expected write transfer set associated with the write transfer determined to be overdue.

18. The method of claim 17 wherein determining if a write transfer associated with the established expected write transfer set is overdue includes timestamping the established expected write transfer set with a first timestamp and comparing elapsed time since the first timestamp to a timeout value.

19. The method of claim 18 wherein determining if a write transfer associated with the established expected write transfer set is overdue includes updating the timestamp to a second, updated timestamp of an established expected write transfer set upon receipt of a write transfer associated with the established expected write transfer set wherein the second, updated timestamp is later than the first timestamp, and comparing elapsed time since the second, updated timestamp to a timeout value.

20. The method of claim 19 wherein a write transfer associated with the established expected write transfer set is determined to be overdue if the elapsed time since a last timestamp exceeds a timeout value.

21. The method of claim 20 further comprising removing an established expected write transfer set if a write transfer associated with the established expected write transfer set is determined to be overdue.

22. The method of claim 21 further comprising incrementing a counter having an output if a write transfer is received for a removed expected write transfer set, comparing the output of the counter to a first threshold and incrementing the timeout value if the output of the counter exceeds the first threshold.

23. The method of claim 22 further comprising determining if the output of the counter has increased within an interval of time and decrementing the timeout value by a first decrement value if the output of the counter has not increased within the interval of time.

24. The method of claim 23 further comprising comparing quantity of active established expected write transfer sets to a second threshold, and in response to the quantity of active established expected write transfer sets exceeding the second threshold, decrementing the timeout value by a second decrement value of greater magnitude than the first decrement value, if the output of the counter has not increased within the interval of time.

* * * * *